US010491318B1

(12) United States Patent
Alevoor et al.

(10) Patent No.: US 10,491,318 B1
(45) Date of Patent: Nov. 26, 2019

(54) SYSTEMS AND METHODS FOR COORDINATING LAYER 1 AND LAYER 2 PROTECTION SWITCHING TECHNIQUES FOR EFFICIENT LAYER 2 TRAFFIC RECOVERY

(71) Applicant: Ciena Corporation, Hanover, MD (US)

(72) Inventors: Veena Alevoor, Alpharetta, GA (US); Satish Gopalakrishna, Johns Creek, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/139,561

(22) Filed: Sep. 24, 2018

(51) Int. Cl.
| | |
|---|---|
| *H04B 10/00* | (2013.01) |
| *H04J 3/16* | (2006.01) |
| *H04J 14/02* | (2006.01) |
| *H04Q 11/00* | (2006.01) |
| *H04J 14/00* | (2006.01) |

(52) U.S. Cl.
CPC ............ *H04J 3/1694* (2013.01); *H04J 3/167* (2013.01); *H04J 14/0227* (2013.01); *H04J 14/0283* (2013.01); *H04J 14/0284* (2013.01); *H04Q 11/0005* (2013.01); *H04Q 11/0062* (2013.01); *H04Q 2011/0081* (2013.01); *H04Q 2011/0088* (2013.01)

(58) Field of Classification Search
CPC .... H04B 10/03; H04B 10/032; H04B 10/035; H04B 10/038; H04J 14/0227; H04J 14/0267; H04J 14/0268
See application file for complete search history.

(56) References Cited

U.S. PATENT DOCUMENTS

| | | |
|---|---|---|
| 2007/0160068 A1 | 7/2007 | Connolly et al. |
| 2008/0219171 A1 | 9/2008 | Gopalakrishna et al. |
| 2008/0285449 A1 | 11/2008 | Larsson et al. |
| 2009/0202240 A1 | 8/2009 | Carroll et al. |
| 2012/0294610 A1 | 11/2012 | Genthner et al. |
| 2013/0230052 A1 | 9/2013 | Gopalakrishna et al. |
| 2014/0186019 A1 | 7/2014 | Chaudhary et al. |
| 2014/0321845 A1* | 10/2014 | Jiang ................. H04Q 11/0067 398/5 |
| 2015/0052399 A1 | 2/2015 | Yau et al. |

(Continued)

OTHER PUBLICATIONS

MEF Metro Ethernet Forum, Technical Specification MEF 17, Service OAM Requirements & Framework—Phase 1, Apr. 2007, pp. 1-20.

(Continued)

*Primary Examiner* — Daniel G Dobson
(74) *Attorney, Agent, or Firm* — Clements Bernard Walker; Christopher L. Bernard; Lawrence A. Baratta, Jr.

(57) ABSTRACT

Systems and methods of coordinating Layer 1 and Layer 2 protection switching include, at a node having a plurality of ports including a first port that is an endpoint of a Layer 1 network and a second port that connects to a Layer 2 network, communicating defects in the Layer 1 network to a local Maintenance End Point (MEP) on the second port and any recovery actions being performed in the Layer 1 network; informing other nodes on the Layer 2 network via the second port of the defects and the recovery actions; and coordinating Layer 2 protection switching in the Layer 2 network based on the defects and based on the recovery actions in the Layer 1 network.

20 Claims, 5 Drawing Sheets

(56) References Cited

U.S. PATENT DOCUMENTS

2016/0006631 A1* 1/2016 Qin .................... H04L 12/2885
398/10
2016/0344471 A1 11/2016 Meng et al.

OTHER PUBLICATIONS

E. Mannie, Network Working Group, Standards Track, Generalized Multi-Protocol Label Switching (GMPLS) Architecture, The Internet Society, Oct. 2004, pp. 1-69.
ITU-T, Telecommunication Standardization Sector of ITU, G.8013/Y.1731, Operation, administration and maintenance (OAM) functions and mechanisms for Ethernet-based networks, Aug. 2015, pp. 1-102.
ITU-T, Telecommunication Standardization Sector of ITU, G.8031/Y.1342, Ethernet linear protection switching, Jan. 2015, pp. 1-96.
ITU-T, Telecommunication Standardization Sector of ITU, G.8032/Y.1344, Ethernet ring protection switching, Aug. 2015, pp. 1-82.
ITU-T, Telecommunication Standardization Sector of ITU, G.8080/Y.1304, Architecture for the automatically switched optical network, Feb. 2012, pp. 1-124.

* cited by examiner

SYSTEMS AND METHODS FOR COORDINATING LAYER 1 AND LAYER 2 PROTECTION SWITCHING TECHNIQUES FOR EFFICIENT LAYER 2 TRAFFIC RECOVERY

FIELD OF THE DISCLOSURE

The present disclosure generally relates to networking. More particularly, the present disclosure relates to systems and methods for coordinating Layer 1 and Layer 2 protection switching techniques for efficient Layer 2 traffic recovery.

BACKGROUND OF THE DISCLOSURE

Optical networks and the like (e.g., Dense Wavelength Division Multiplexed (DWDM), Optical Transport Network (OTN), and the like) at various layers are deploying control plane systems and methods. Control planes provide automatic allocation and management of network resources in an end-to-end manner, including managing protection such as through mesh restoration. Example control planes may include Automatically Switched Optical Network (ASON) as defined in ITU-T G.8080/Y.1304, Architecture for the automatically switched optical network (ASON) (02/2005), the contents of which are incorporated herein by reference; Generalized Multi-Protocol Label Switching (GMPLS) Architecture as defined in IETF Request for Comments (RFC): 3945 (10/2004) and the like, the contents of which are incorporated herein by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP, and Label Switched Paths (LSPs) in GMPLS and MPLS. Control planes are configured to compute paths, to route/signal the SNCs/LSPs, and program the underlying hardware accordingly. As described herein, such optical networks provide Layer 1 connectivity including providing protection at Layer 1.

Layer 2 packet traffic operates over the optical network. Layer 2 networks can also support protection, such as via G.8031/Y.1342 (01/15) "Ethernet linear protection switching" and G.8032/Y.1344 (08/15) "Ethernet ring protection switching," the contents of each are incorporated herein by reference. When there is a fault affecting the optical network at Layer 1, there is a need to avoid problems between the protection switching techniques at Layer 1 and Layer 2. Specifically, the objective is to avoid sympathetic switches at Layer 2 during any Layer 1 protection switch or maintenance activity.

There are generally two conventional approaches to avoid a Layer 2 sympathetic switch. First, a hold-off timer can be used to delay the Layer 1 defect propagation to the Layer 2 network, such that a Layer 2 port is notified of Layer 1 failures only after expiration of the hold-off timer. Second, Continuity Check Message (CCM) timeout can be set such that the time is greater than a mesh restoration time in the Layer 1 network (e.g., typically around 300 ms). Note, the Layer 2 network utilizes CCMs to determine faults. Of course, configuring the CCM timeout greater than the mesh restoration significantly delays failure detection for Ethernet-only segments. Also, if there is no protection or if mesh restoration is unavailable, the Layer 2 protection will only operate after the hold-off timer or the greater CCM timeout. Further, Layer 1 protection times vary significantly based on the underlying protection mechanisms, e.g., mesh restoration (~300 ms) versus Automatic Protection Switching (APS) (<50 ms).

Thus, the conventional approaches delay the propagation of Layer 1 faults such that Layer 2 is not made aware of Layer 1 faults for the delay duration. Also, this makes the Layer 1 switching a priority which may not be possible in all scenarios. That is, the available bandwidth can change in the Layer 1 network and protection for Layer 1 paths is not always guaranteed. The conventional approaches assume there is always Layer 1 protection available.

BRIEF SUMMARY OF THE DISCLOSURE

In an embodiment, a method of coordinating Layer 1 and Layer 2 protection switching includes, at a node having a plurality of ports including a first port that is an endpoint of a Layer 1 network and a second port that connects to a Layer 2 network, communicating defects in the Layer 1 network to a local Maintenance End Point (MEP) on the second port and any recovery actions being performed in the Layer 1 network; informing other nodes on the Layer 2 network via the second port of the defects and the recovery actions; and coordinating Layer 2 protection switching in the Layer 2 network based on the defects and based on the recovery actions in the Layer 1 network. The coordinating Layer 2 protection switching can include one or more of preventing the Layer 2 protection switching while the recovery actions are in process, causing the Layer 2 protection switching responsive to a maximum time, causing the Layer 2 protection switching responsive to notification of failure of the recovery actions, and causing the Layer 2 protection switching immediately after the communicating responsive to no recovery actions. The defects can be one of Optical Transport Network (OTN) or Synchronous Optical Network (SONET) path or line defects. The recovery actions can include 1+1 or 1:1 protection switching, Automatic Protection Switching (APS), and mesh restoration, and wherein the Layer 2 protection switching includes one of G.8032 Ethernet Ring Protection and G.8031 Ethernet Linear Protection. The informing can utilize a Connectivity Fault Management (CFM) frame with added information providing the recovery actions. The added information can be via a Type-Length-Value (TLV) in the CFM frame. The Layer 2 network can suppress notification of the defects as long as the added information is present. Responsive to no recovery actions, the method can further include immediately causing the Layer 2 protection switching in the Layer 2 network based on the defects.

In another embodiment, a node in a network configured to coordinate Layer 1 and Layer 2 protection switching includes a plurality of ports including a first port that is an endpoint of a Layer 1 network and a second port that connects to a Layer 2 network; and a controller configured to cause communication of defects in the Layer 1 network to a local Maintenance End Point (MEP) on the second port and any recovery actions being performed in the Layer 1 network; communication to other nodes on the Layer 2 network via the second port of the defects and the recovery actions; and coordination of Layer 2 protection switching in the Layer 2 network based on the defects and based on the recovery actions in the Layer 1 network. The coordination Layer 2 protection switching can include one or more of prevention of the Layer 2 protection switching while the recovery actions are in process, implementation of the Layer 2 protection switching responsive to a maximum time, implementation of the Layer 2 protection switching responsive to notification of failure of the recovery actions, and implementation of the Layer 2 protection switching immediately after the communicating responsive to no recovery actions. The defects can be one of Optical Transport Network (OTN) or Synchronous Optical Network (SONET) path or line defects. The recovery actions can include 1+1 or 1:1 protection switching, Automatic Protection Switching (APS), and mesh restoration, and wherein the Layer 2 protection switching includes one of G.8032 Ethernet Ring Protection and G.8031 Ethernet Linear Protection. The communication to other nodes can utilize a Connectivity Fault Management (CFM) frame with added information providing the recovery actions. The added information can be via a Type-Length-Value (TLV) in the CFM frame. The Layer 2 network can suppress notification of the defects as long as the added information is present. Responsive to no recovery actions, the controller can be further configured to immediately cause the Layer 2 protection switching in the Layer 2 network based on the defects.

In a further embodiment, a network includes a plurality of nodes interconnected to one another, wherein a first subset of the plurality of nodes include Layer 1 nodes for a Time Division Networking (TDM) network, a second subset of the plurality of nodes include Layer s nodes for an Ethernet network, and at least one node is an endpoint node in both the TDM network and the Ethernet network, wherein the endpoint node is configured to communicate defects in the TDM network to a local Maintenance End Point (MEP) and any recovery actions being performed in the TDM network; communicate the defects and the recovery actions to other nodes on the Ethernet nodes; and cause coordination of Layer 2 protection switching in the Ethernet network based on the defects and based on the recovery actions in the TDM network. The coordination Layer 2 protection switching can include one or more of prevention of the Layer 2 protection switching while the recovery actions are in process, implementation of the Layer 2 protection switching responsive to a maximum time, implementation of the Layer 2 protection switching responsive to notification of failure of the recovery actions, and implementation of the Layer 2 protection switching immediately after the communicating responsive to no recovery actions. The communication to other nodes can utilize a Connectivity Fault Management (CFM) frame with added information providing the recovery actions. Responsive to no recovery actions, the endpoint node can be configured to immediately cause the Layer 2 protection switching in the Ethernet network based on the defects.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for coordinating Layer 1 and Layer 2 protection switching techniques for efficient Layer 2 traffic recovery. The systems and methods provide integration/coordination between Layer 1 and Layer 2 protection mechanisms enabling optimized Layer 2 protection during Layer 1 network recovery or maintenance operations. The systems and methods ensure Layer 2 protection mechanisms are aware of the underlying Layer 1 protection mechanisms, enabling efficient Layer 2 traffic recovery. Also, the systems and methods remove the dependence of using CCM failure detection over Layer 1 links as faults affecting Layer 1 links are communicated to Layer 2 protection mechanisms.

Optical Network

Figure 1:
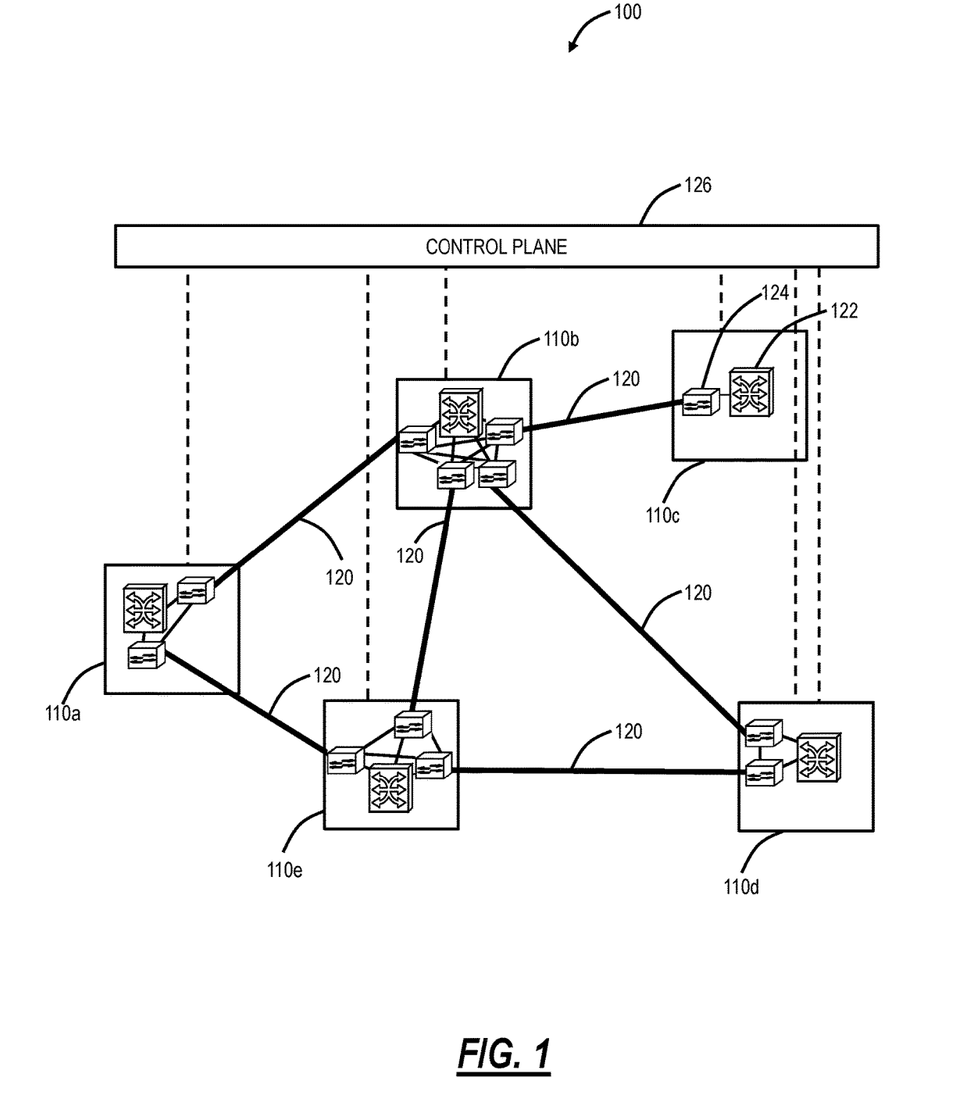
FIG. 1 is a network diagram of an example optical network with five interconnected sites.

FIG. 1 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN), Synchronous Optical Network (SONET)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control. Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example for implementing the path computation systems and methods.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 110 at each particular node 110. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

Example Network Element/Node

Figure 2:
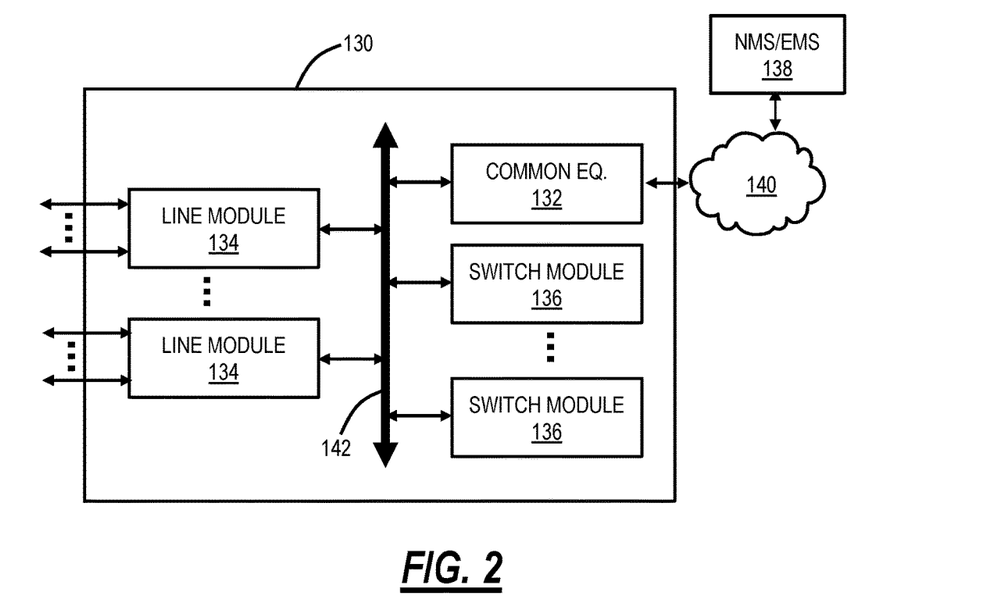
FIG. 2 is a block diagram of a node for use with the systems and methods described herein.

FIG. 2 is a block diagram of a node 130 for use with the systems and methods described herein. The node 130 can be the switch 122, the WDM network element 124, or the like. In an embodiment, the node 130 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 130 can be any of an OTN Add/Drop Multiplexer (ADM), a Multi-Service Provisioning Platform (MSPP), a Digital Cross-Connect (DCS), an optical cross-connect, a POTS, an optical switch, a router, an Ethernet switch, a Wavelength Division Multiplexing (WDM) terminal, an access/aggregation device, etc. That is, the node 130 can be a system with ingress and egress digital signals and switching of channels, timeslots, tributary units, etc. Also, the node 130 can be a system with ingress and egress of optical signals and switching/routing of wavelengths. Of course, the node 130 can combine both digital signals and optical signals. While the node 130 is generally shown as an optical network element, the systems and methods contemplated for use with any switching fabric, network element, or control plane network based thereon.

The node 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), Software Defined Networking (SDN) controller, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane as described herein. The node 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the node 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the node 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching), OTN granularity (Layer 1 switching), Ethernet granularity (Layer 2 switching); and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the node 130 can include other components which are omitted for illustration purposes, and that the systems and methods described herein are contemplated for use with a plurality of different network elements with the node 130 presented as an example of a type of network element. For example, in another embodiment, the node 130 may not include the switch modules 136, but rather have the corresponding functionality in the line modules 134 (or some equivalent) in a distributed fashion. For the node 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 130 is merely presented as one example of node 130 for the systems and methods described herein.

Controller

Figure 3:
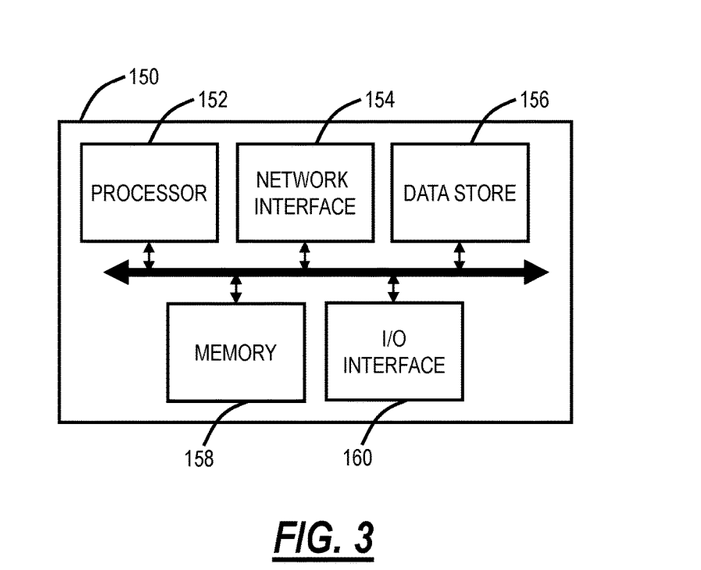
FIG. 3 is a block diagram of a controller to provide control plane processing and/or Operations, Administration, Maintenance, and Provisioning (OAM&P) for the node of FIG. 2.

FIG. 3 is a block diagram of a controller 150 to provide control plane processing and/or OAM&P for the node 130. The controller 150 can be part of the common equipment, such as common equipment 132 in the node 130, or a stand-alone device communicatively coupled to the node 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include, for example, an Ethernet card (e.g., 10BaseT, Fast Ethernet, Gigabit Ethernet) or a wireless local area network (WLAN) card (e.g., 802.11). The network interface 154 can include address, control, and/or data connections to enable appropriate communications on the network 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

The controller 150 can be configured to communicate with other controllers 150 in the network 100 to operate the control plane 126 and for control plane signaling. This communication may be either in-band or out-of-band. For SONET networks and similarly for SDH networks, the controllers 150 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements. For example, the GCC may be used for in-band signaling or routing to carry control plane traffic. Based on the intermediate equipment's termination layer, different bytes may be used to carry control plane signaling. Other mechanisms are also contemplated for control plane signaling.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. The control plane 126 can be a distributed control plane; thus, a plurality of the controllers 150 can act together to operate the control plane 126 using the control plane signaling to maintain database synchronization. In source-based routing, the controller 150 at a source node 110 for a connection is responsible for path computation and establishing by signaling other controllers 150 in the network 100, such as through a SETUP message. For example, the source node 110 and its controller 150 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e., traversing the links 120 through the nodes 110 from the originating node 110 to the destination node 110 based on a plurality of constraints such as administrative weights on the links, bandwidth availability on the links 120, etc.

Protection

Again, the network 100 can include various different protection techniques at Layer 1 and/or Layer 2. At Layer 1, the protection mechanisms can include mesh restoration through the control plane 126 which can restore service on the order of several hundred milliseconds. The protection mechanisms at Layer 1 can also include 1+1, 1:1, APS, etc. where there is dedicated protection, and the corresponding service can be restored in less than 50 ms. Other mechanisms are also contemplated. At Layer 2, the protection mechanisms involved rerouting packet traffic to avoid a faulted link 120. Layer 2 utilizes CCMs which are "heartbeat" messages used to ensure a link 120 is operational and Layer 2 protection is performed responsive to a timeout or failure to receive a number of CCMs over time.

Again, the ideal scenario is to address Layer 1 faults at Layer 1 and avoid any Layer 2 protection mechanisms. As described herein, the conventional approach imposes a delay in any Layer 2 protection to provide Layer 1 enough time to deal with any faults. Conventionally, there is no other coordination.

Figure 4:
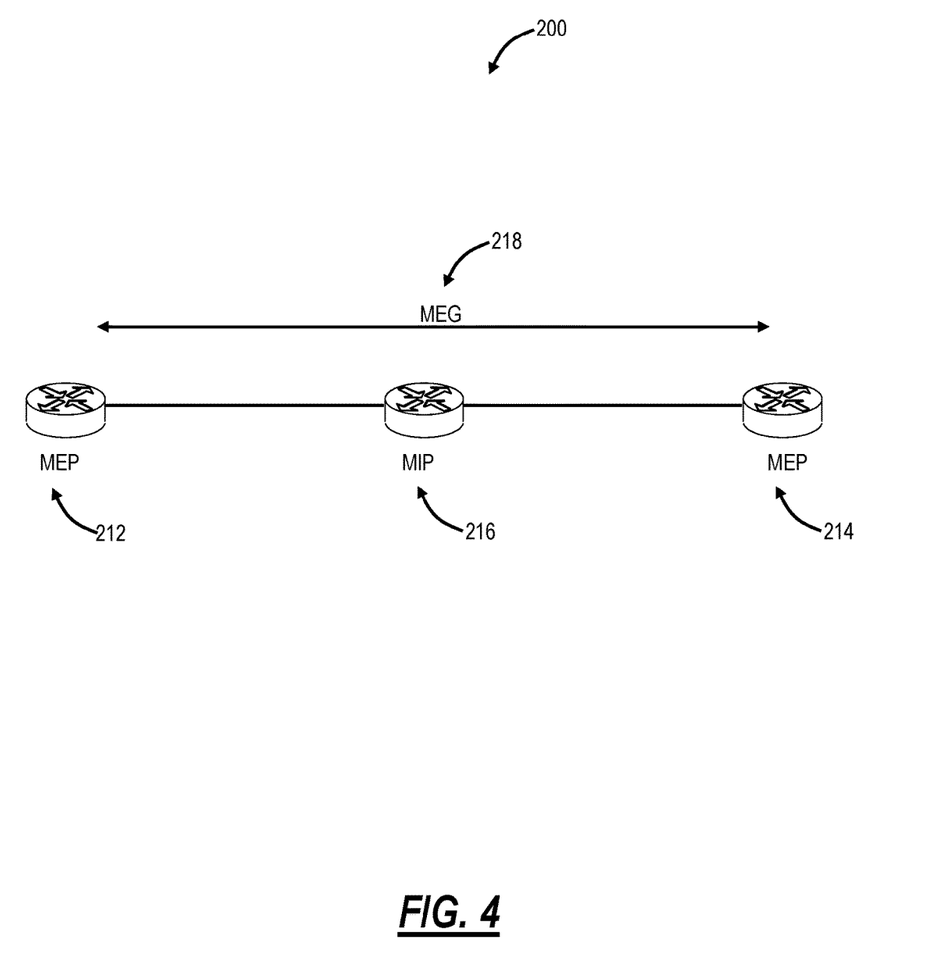
FIG. 4 is a network diagram of an example network utilizing Ethernet Operations, Administration, and Maintenance (OAM) mechanisms.

FIG. 4 is a network diagram of an example network 200 utilizing Ethernet Operations, Administration, and Maintenance (OAM) mechanisms. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (08/2015) "Operations, administration and maintenance (OAM) functions and mechanisms for Ethernet-based networks," the contents of which are herein incorporated by reference. Further, the MEF also defines Ethernet OAM in various technical specifications, such as MEF 17 (04/2007) "Service OAM Requirements & Framework," the contents of which are herein incorporated by reference.

For illustration purposes, the network 200 includes three interconnected network elements 212, 214, 216. Fundamental to CFM is the concept of a Maintenance Entity Group (MEG) or a Maintenance Association (MA), which is the identified network transport construct spanning the various network nodes underlying a given service or set of services. CFM relies on well-defined messages (OAM PDUs) exchanged between the network elements, specifically and in particular each Maintenance End Point (MEP) that provides origination and termination of the service transport path(s) for a MEG or MA. The network elements 212, 214 are defined as an MEP. In CFM, an MEP is configured to source and sink OAM PDUs, i.e., source and sink within a single configured MD (Maintenance Domain), pass-thru if MD Level is higher than the configured level for the MEP, and discard if MD Level is lower. The MEPs 212, 214 are also configured to participate in performance monitoring such as loss measurement, delay measurement, link trace, loopback, etc. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 216 is defined as a MIP which resides between MEPs, i.e., the MIP 216 is communicatively coupled between the MEPs 212, 214. A MIP is configured to process and forward CFM frames but does not initiate CFM frames. Also, Ethernet Path terminology is used to denote a point-to-point Ethernet connection between two nodes, e.g., the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the systems and methods described herein.

The systems and methods contemplate implementation and operation in networks, network devices, network elements, etc. such as those compliant with IEEE 802.1ag-2007, G.8013/Y.1731, and/or MEF. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same aspect. Those of ordinary skill in the art will recognize while described herein as the MEG; the MEG could also be referred to as the MEG 218. Generally, the MA and MEG 218 relate to an administrative grouping relative to the MEPs 212, 214.

The network elements 212, 214, 216 are configured in a MEG 218 which enable a grouping of nodes in a maintenance group for OAM to be grouped on different spans. The MEG 218 is a set of MEPs, each configured with a same unique MA ID code (UMC) and Maintenance Association Identifier (MAID) and Maintenance Domain (MD) level. The MEG 18 may be thought of as a full mesh a Maintenance Entities (MEs), the MEs including MEPs, MIPs, etc., with a set of MEPs configured therebetween.

Coordinated Layer 1 and Layer 2 Protection

Figure 5:
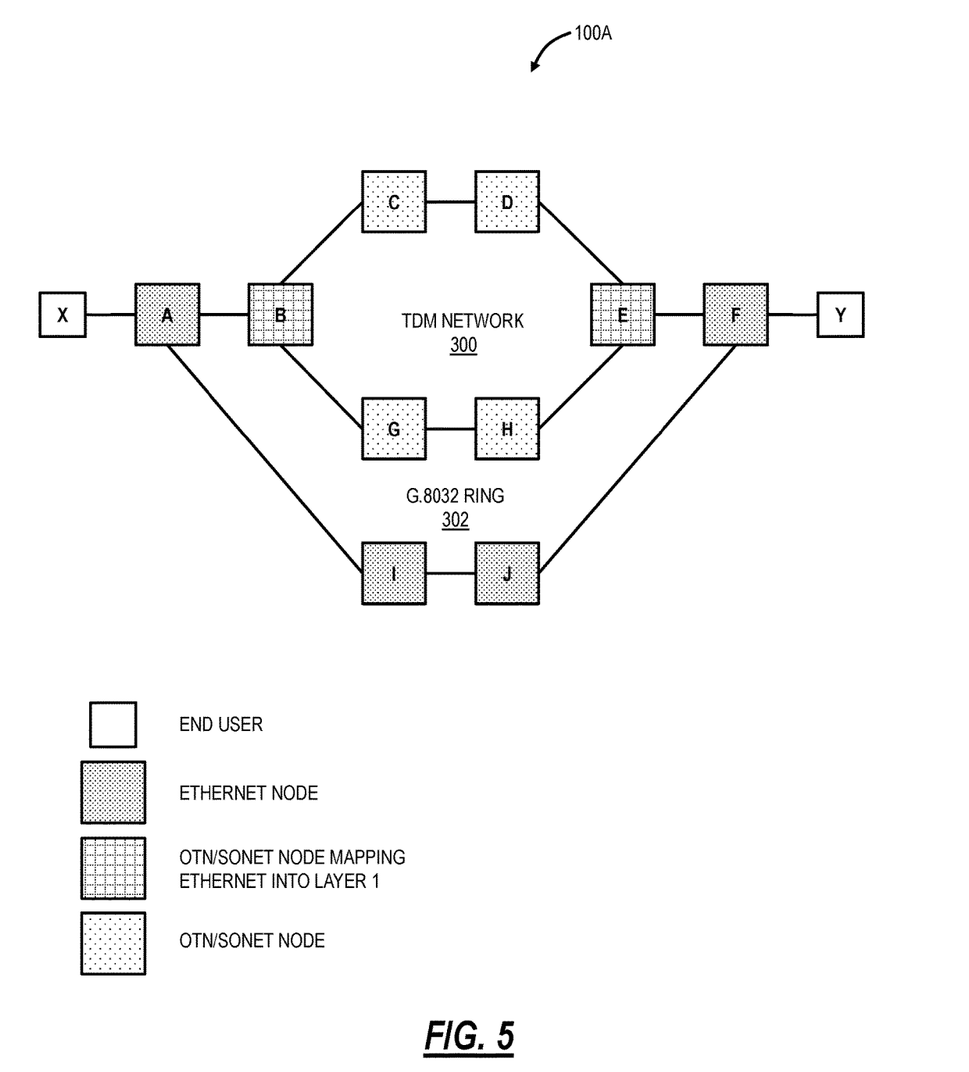
FIG. 5 is a network diagram of a network which includes various nodes implementing Layer 1 and Layer 2 connections and protection.

FIG. 5 is a network diagram of a network 100A which includes various nodes implementing Layer 1 and Layer 2 connections and protection. The network 100A is utilized for illustrating the systems and methods for integrating Layer 1 and Layer 2 protection switching techniques for efficient Layer 2 traffic recovery. Those with ordinary skill in the art will recognize the systems and methods can be implemented in other networks. The network 100A includes nodes A-F and end-user devices X, Y. In this example, the network 100A includes a TDM network 300 which includes the nodes B-E. For example, the nodes B-E can be the node 130, supporting OTN or SONET, at Layer 1, and the Layer 1 protection can include mesh restoration via the control plane 126. The network 100A can also include an Ethernet G.8032 ring 302 which provides Layer 2 protection. The G.8032 ring 302 interconnects the user devices X, Y at the packet layer and includes the nodes A, B, E, F, I and J. Specifically, the G.8032 ring 302 is closed in part through the TDM network 300. The nodes A, F, I, J can be Ethernet nodes, such as the switches 122. The nodes B, E are configured to map/demap Ethernet to/from OTN/SONET and the nodes B, E are configured to monitor for both TDM and Ethernet failures. Nodes G and H are Layer 1 (OTN/SONET) nodes and are not visible to Layer 2 network. Layer 2 will see nodes B and E as directly connected. The G.8032 ring 302 can be closed via nodes B-C-D-E or B-G-H-E based on the Layer 1 path selection at nodes B, E.

User traffic flows from node X to node Y. Traffic can flow on one of the following paths.

| Path Number | Nodes |
| --- | --- |
| 1 | X-A-B-C-D-E-F-Y |
| 2 | X-A-B-G-H-E-F-Y |
| 3 | X-A-I-J-F-Y |

Failures/faults in the TDM network 300 are detected both at Layer 1 and Layer 2. Assume, the traffic is flowing via path 1, there is a fiber cut or other link issue between nodes C, D, nodes B, E detect this condition and initiate the Layer 1 mesh protection, and, after the successful completion of the Layer 1 mesh protection, the traffic now flows on path 2.

Also, the nodes A, B, E, F are configured with CFM MEPs and running the CCM continuity check at regular intervals on each link segment. The link down condition between nodes C, D can now be detected in the G.8032 ring 302 network, and ring protection is invoked at the same time from the G.8032 ring 302. The traffic will now flow on path 3, even though the TDM network 300 restored on path 2.

The systems and methods make the Layer 2 endpoints, the nodes B, E, aware of Layer 1 protection mechanisms such that the Layer 2 protection mechanism can coordinate the Layer 2 traffic recovery in light of any Layer 1 activity.

Figure 6:
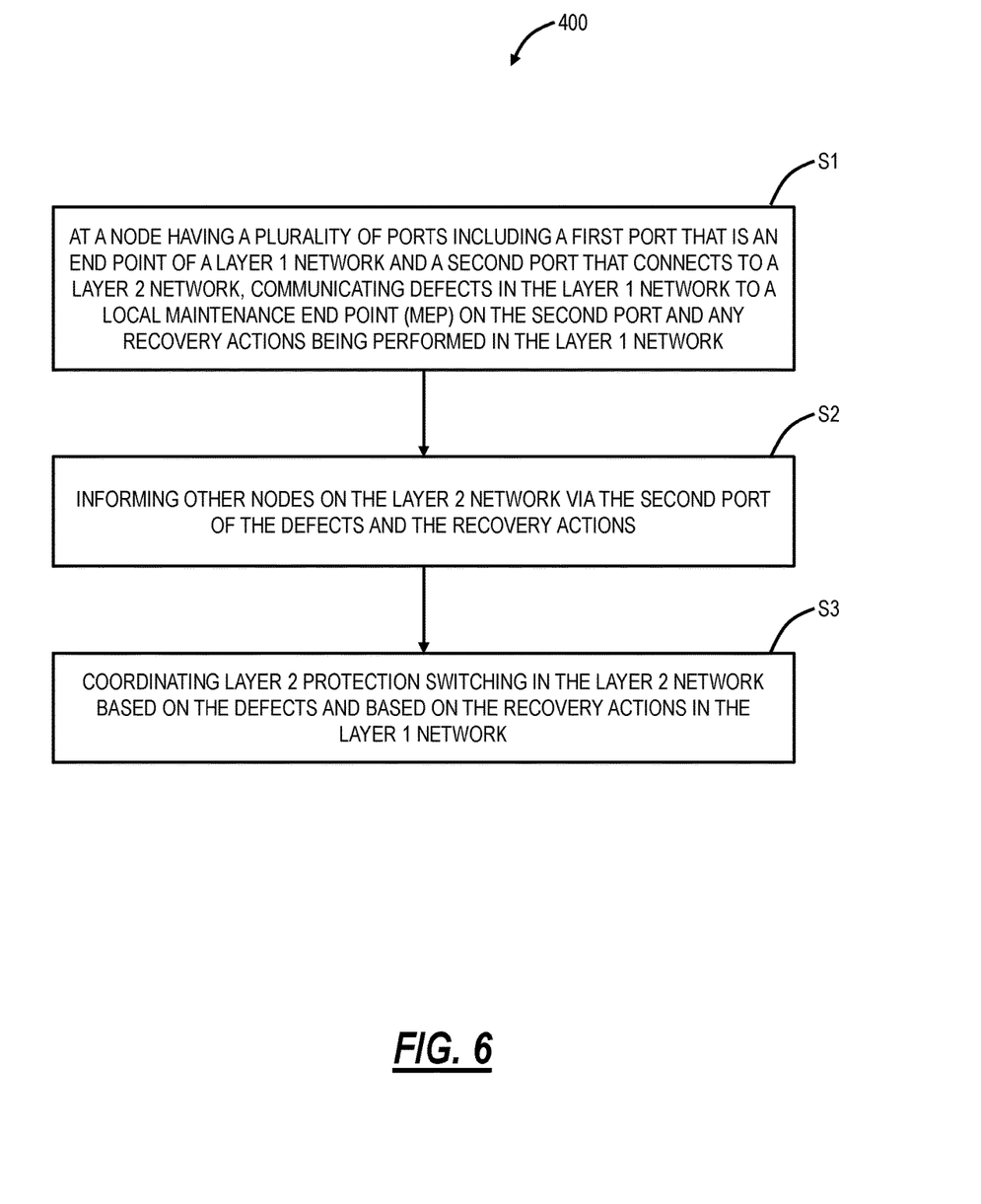
FIG. 6 is a flowchart of a process of coordinating Layer 1 and Layer 2 protection switching.

FIG. 6 is a flowchart of a process 400 of coordinating Layer 1 and Layer 2 protection switching. The process 400 includes, at a node having a plurality of ports including a first port that is an endpoint of a Layer 1 network and a second port that connects to a Layer 2 network, communicating defects in the Layer 1 network to a local Maintenance End Point (MEP) on the second port and any recovery actions being performed in the Layer 1 network (step S1). For example, the node can be the node B, E in the network 100A and a CFM MEP is configured on the port connected to the node A, F, e.g., between nodes A, B or E, F. When the Layer 1 path detects the defects (e.g., OTN/SONET path/line defects), it notifies the local MEP about the failure. Additionally, the process 400 includes an indication if there is any recovery action being taken (or configured) for Layer 1 protection switching.

Next, the process 400 includes informing other nodes on the Layer 2 network via the second port of the defects and the recovery actions (step S2). On receiving the communication from the Layer 1 network in step S1, the local MEP informs its peers on the Layer 2 network (e.g., same maintenance domain) of this action. The informing can utilize a Connectivity Fault Management (CFM) frame with added information providing the recovery actions. The added information can be via a Type-Length-Value (TLV) in the CFM frame. Also, the Layer 2 network can suppress notification of the defects as long as the added information is present.

For example, a new signal named ProtSwitchInProg can be added to the CFM signaling. This signal can carry the MEG ID for the group affected by the Layer 1 protection switch. When the Layer 1 port goes down due to (server layer) OTN/SONET defects (e.g., line cut between node C, D) and, if the Layer 1 recovery mechanism is configured (e.g., with the protection routes available for switching), then on ports B=>A and E=>F, the CFM ProtSwitchInProg is sent towards the downstream or peer MEPs (e.g., at nodes A, F) for the duration of the SNC mesh/Layer 1 recovery period, e.g., 300 ms.

The process 400 finally includes coordinating Layer 2 protection switching in the Layer 2 network based on the defects and based on the recovery actions in the Layer 1 network (step S3). The coordinating Layer 2 protection switching can include one or more of preventing the Layer 2 protection switching while the recovery actions are in process, causing the Layer 2 protection switching responsive to a maximum time, causing the Layer 2 protection switching responsive to notification of failure of the recovery actions, and causing the Layer 2 protection switching immediately after the communicating responsive to no recovery actions.

The recovery actions can include 1+1 or 1:1 protection switching, Automatic Protection Switching (APS), and mesh restoration, and the Layer 2 protection switching can include one of G.8032 Ethernet Ring Protection and G.8031 Ethernet Linear Protection. Responsive to no recovery actions, the process 400 can include immediately causing the Layer 2 protection switching in the Layer 2 network based on the defects.

The transmission of the CFM ProtSwitchInProg signal can cease as soon as the Layer 1 recovery actions are complete. The ProtSwitchInProg signal identifies that there is another protection switch activity in progress that can eventually recover the Layer 2 traffic. Receiving the ProtSwitchInProg signal can suppress the trigger for Layer 2 protection, e.g., a notification for Ring Automatic Protection Switching (RAPS)/Link Aggregation Group (LAG).

Also, a maximum Layer 1 recovery time can be decided, and CFM service can ignore the ProtSwitchInProg signaling after this maximum Layer 1 recovery time and continue with Layer 2 protection. Also, the L2 node can be configured to ignore this ProtSwitchInProg and go ahead with L2 protection switching. In cases where protection is not configured in the Layer 1 network, local MEPs are notified only of the failure but not of the recovery action, and thus no ProtSwitchInProg signal is transmitted towards the peer. Here, port down notifications are processed at the earliest in this scenario so that Layer 2 protection recovery can be performed immediately after the defects and recover the traffic.

The process 400 provides a single approach to detect the failures in the Layer 1 network and propagate both failure and recovery mechanism to Layer 2 entities that would be affected. The process 400 also isolates the Layer 1 faults and removes the limitations imposed on Layer 2 CCM timeout configurations. This makes the Layer 2 fault detection configuration independent of Layer 1.

The Layer 2 protection can be used at the earliest when there is no Layer 1 bandwidth available or no protection mechanism configured. The Layer 2 network entities are made aware when there is Layer 1 recovery and have the ability either use it or ignore it. The process 400 also eliminates the need to calculate the hold off time which can vary depending on the protection application used on Layer 1 side. The Layer 2 hold off mechanism is dynamic with this approach, and Layer 2 protection can operate in as soon as Layer 1 fails to recover. The process 400 can also be used for avoiding sympathetic switches during Layer 1 network maintenance activities which can involve SNC re-route, etc.

In another embodiment, the node 130 in a network configured to coordinate Layer 1, and Layer 2 protection switching includes a plurality of ports 134 including a first port that is an endpoint of a Layer 1 network and a second port that connects to a Layer 2 network; and a controller 150 configured to cause communication of defects in the Layer 1 network to a local Maintenance End Point (MEP) on the second port and any recovery actions being performed in the Layer 1 network; communication to other nodes on the Layer 2 network via the second port of the defects and the recovery actions; and coordination of Layer 2 protection switching in the Layer 2 network based on the defects and based on the recovery actions in the Layer 1 network.

In another embodiment, a network 100A includes a plurality of nodes A-F interconnected to one another, wherein a first subset of the plurality of nodes include Layer 1 nodes for a Time Division Networking (TDM) network, a second subset of the plurality of nodes include Layer 2 nodes for an Ethernet network, and at least one node is an endpoint node in both the TDM network and the Ethernet network, wherein the endpoint node is configured to communicate defects in the TDM network to a local Maintenance End Point (MEP) and any recovery actions being performed in the TDM network; communicate the defects and the recovery actions to other nodes on the Ethernet nodes; and cause coordination of Layer 2 protection switching in the Ethernet network based on the defects and based on the recovery actions in the TDM network.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of coordinating Layer 1 and Layer 2 protection switching, comprising:
   at a node having a plurality of ports including a first port that is an endpoint of a Layer 1 network and a second port that connects to a Layer 2 network, communicating defects in the Layer 1 network to a local Maintenance End Point (MEP) on the second port and any recovery actions being performed in the Layer 1 network;
   informing other nodes on the Layer 2 network via the second port of the defects and the recovery actions; and
   coordinating Layer 2 protection switching in the Layer 2 network based on the defects and based on the recovery actions in the Layer 1 network.

2. The method of claim 1, wherein the coordinating Layer 2 protection switching includes one or more of
   preventing the Layer 2 protection switching while the recovery actions are in process,
   causing the Layer 2 protection switching responsive to a maximum time,
   causing the Layer 2 protection switching responsive to notification of failure of the recovery actions, and
   causing the Layer 2 protection switching immediately after the communicating responsive to no recovery actions.

3. The method of claim 1, wherein the defects are one of Optical Transport Network (OTN) or Synchronous Optical Network (SONET) path or line defects.

4. The method of claim 1, wherein the recovery actions include 1+1 or 1:1 protection switching, Automatic Protection Switching (APS), and mesh restoration, and wherein the Layer 2 protection switching includes one of G.8032 Ethernet Ring Protection and G.8031 Ethernet Linear Protection.

5. The method of claim 1, wherein the informing utilizes a Connectivity Fault Management (CFM) frame with added information providing the recovery actions.

6. The method of claim 5, wherein the added information is via a Type-Length-Value (TLV) in the CFM frame.

7. The method of claim 5, wherein the Layer 2 network suppresses notification of the defects as long as the added information is present.

8. The method of claim 1, wherein, responsive to no recovery actions, the method further comprising:
   immediately causing the Layer 2 protection switching in the Layer 2 network based on the defects.

9. A node in a network configured to coordinate Layer 1 and Layer 2 protection switching, comprising:
   a plurality of ports including a first port that is an endpoint of a Layer 1 network and a second port that connects to a Layer 2 network; and
   a controller configured to cause
      communication of defects in the Layer 1 network to a local Maintenance End Point (MEP) on the second port and any recovery actions being performed in the Layer 1 network;
      communication to other nodes on the Layer 2 network via the second port of the defects and the recovery actions; and
      coordination of Layer 2 protection switching in the Layer 2 network based on the defects and based on the recovery actions in the Layer 1 network.

10. The node of claim 9, wherein the coordination Layer 2 protection switching includes one or more of
    prevention of the Layer 2 protection switching while the recovery actions are in process,
    implementation of the Layer 2 protection switching responsive to a maximum time,
    implementation of the Layer 2 protection switching responsive to notification of failure of the recovery actions, and
    implementation of the Layer 2 protection switching immediately after the communicating responsive to no recovery actions.

11. The node of claim 9, wherein the defects are one of Optical Transport Network (OTN) or Synchronous Optical Network (SONET) path or line defects.

12. The node of claim 9, wherein the recovery actions include 1+1 or 1:1 protection switching, Automatic Protection Switching (APS), and mesh restoration, and wherein the Layer 2 protection switching includes one of G.8032 Ethernet Ring Protection and G.8031 Ethernet Linear Protection.

13. The node of claim 9, wherein the communication to other nodes utilize a Connectivity Fault Management (CFM) frame with added information providing the recovery actions.

14. The node of claim 13, wherein the added information is via a Type-Length-Value (TLV) in the CFM frame.

15. The node of claim 13, wherein the Layer 2 network suppresses notification of the defects as long as the added information is present.

16. The node of claim 9, wherein, responsive to no recovery actions, the controller is further configured to immediately cause the Layer 2 protection switching in the Layer 2 network based on the defects.

17. A network comprising:
    a plurality of nodes interconnected to one another,
    wherein a first subset of the plurality of nodes include Layer 1 nodes for a Time Division Networking (TDM) network, a second subset of the plurality of nodes include Layer s nodes for an Ethernet network, and at least one node is an endpoint node in both the TDM network and the Ethernet network,
    wherein the endpoint node is configured to
       communicate defects in the TDM network to a local Maintenance End Point (MEP) and any recovery actions being performed in the TDM network;

communicate the defects and the recovery actions to other nodes on the Ethernet nodes; and cause coordination of Layer 2 protection switching in the Ethernet network based on the defects and based on the recovery actions in the TDM network.

18. The network of claim 17, wherein the coordination Layer 2 protection switching includes one or more of prevention of the Layer 2 protection switching while the recovery actions are in process, implementation of the Layer 2 protection switching responsive to a maximum time, implementation of the Layer 2 protection switching responsive to notification of failure of the recovery actions, and implementation of the Layer 2 protection switching immediately after the communicating responsive to no recovery actions.

19. The network of claim 17, wherein the communication to other nodes utilize a Connectivity Fault Management (CFM) frame with added information providing the recovery actions.

20. The network of claim 17, wherein, responsive to no recovery actions, the endpoint node is configured to immediately cause the Layer 2 protection switching in the Ethernet network based on the defects.

* * * * *